Feb. 11, 1930. J. S. CONROY 1,747,105
DEVICE FOR THE GUIDANCE OF PERSONS BEING TAUGHT MOTOR DRIVING
Filed Nov. 3, 1928
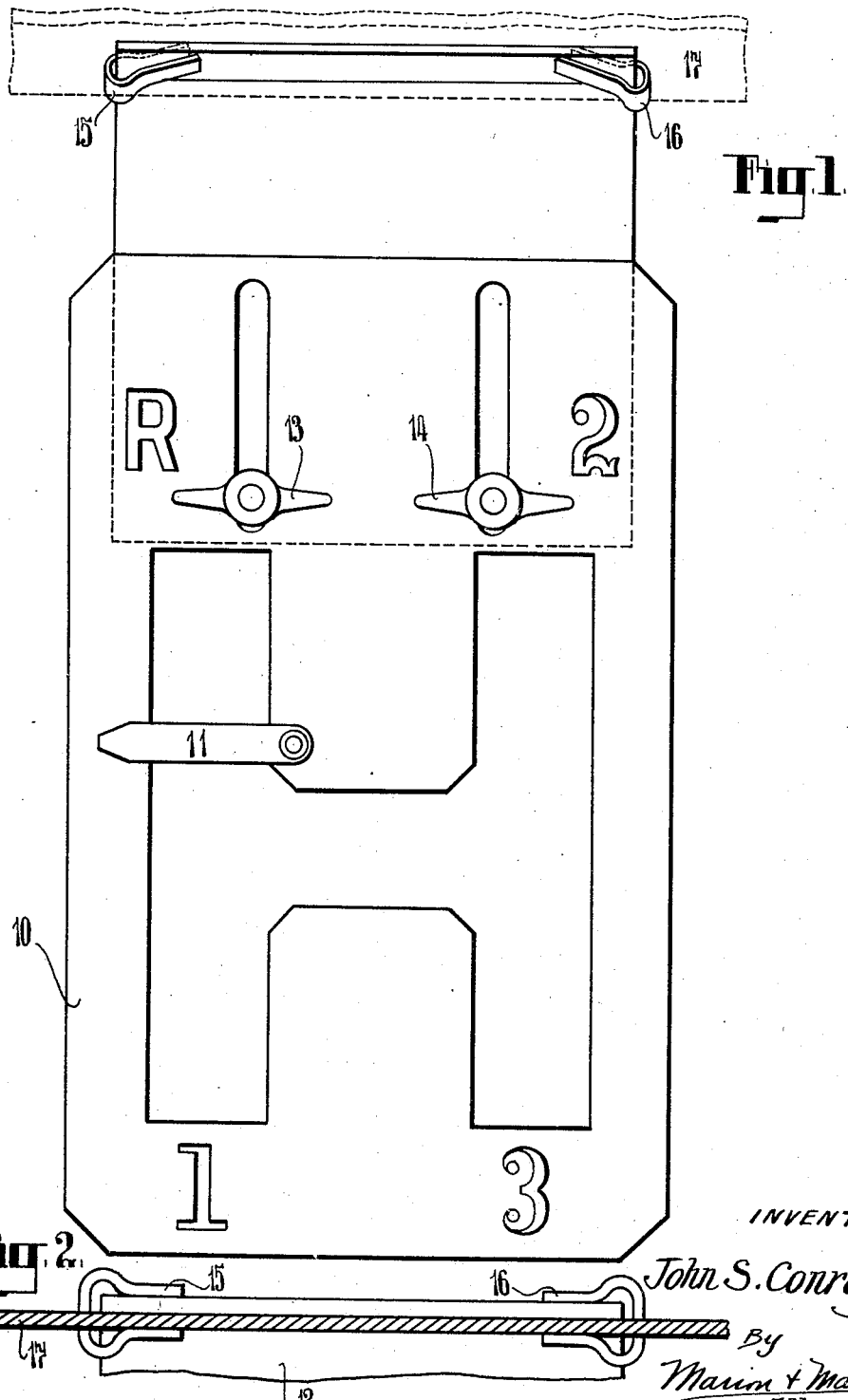
INVENTOR.
John S. Conroy
By
Marin + Marin
Attorneys.

UNITED STATES PATENT OFFICE

JOHN SPENCER CONROY, OF KALGOORLIE, WESTERN AUSTRALIA, AUSTRALIA

DEVICE FOR THE GUIDANCE OF PERSONS BEING TAUGHT MOTOR DRIVING

Application filed November 3, 1928, Serial No. 317,048, and in Australia August 23, 1928.

This invention relates to a device for the guidance of persons being taught motor-driving.

It is well known that the greatest difficulty persons learning motor-driving have to contend with is to remember the relative positions for the various gear changes.

The present invention relates to a device whereby the learner will have a visual indicator associated with the gear shift lever to show the various gear changes.

The invention will more readily be understood by reference to the accompanying drawings, in which:—

Figure 1 is a plan of the device connected to the dashboard, which is shown in dotted lines, whilst Fig. 2 is a sectional elevation taken through the dashboard to show the method of attachment.

In these drawings, 10 indicates a rectangular member of sheet metal or other suitable material which is formed with an H-like space, the legs of which correspond to the various gear changes. Thus, the the lower left-hand leg of the H corresponds to the low gear position, and is marked I. The top left-hand leg corresponds to the reverse and is marked R. The top right-hand leg is intermediate and is marked 2, whilst the lower right-hand leg is top gear and is referenced 3. The central passage connecting the right and left sets of legs corresponds to the neutral position. In juxtaposition to the commencement of the top left-hand leg or reverse position, there will be normally spaced a swinging arm 11, so as to indicate to the learner that the reverse position is unusual, and prevent it from being accidentally engaged. This swinging lever 11 can be pushed out of its normal position if required. The lever 11 may be made fast in its position by any suitable means such as a thumb screw or wing nut, tightening the lever about its swinging axis and which may be loosened to permit the movement of said lever. But, I prefer, to mount the lever 11 on the plate 10 in such a manner that it will be held in position through friction only, for the lever 11 can then be displaced merely by applying sufficient force to the gear shift lever to overcome the frictional resistance of the lever 11. It will be understood that this frictional engagement of the arm may be obtained by means of a rivet, spring bolt or any other like devices known in the art. Connected to the member 10 is another member 12. The connection between the members 10 and 12 is by means of wing or other nuts 13 and 14 adapted to lock them together so as to provide for a greater or less overlap, as may be required. The far end of the member 12 will be bent upwards at an angle, and clips 15 and 16 will be used to connect the member 12 to the dashboard 17. It is obvious that the bent-up portion of the member 12 will register with the underside of the dashboard, and that any suitable form of clip may be used other than the form illustrated.

The device is used as follows:

The knob of the gear shift lever is unscrewed and the device slipped over so as to surround the gear shift lever. The knob is then replaced, and the device, by means of the clips 15 and 16, connected to the dashboard, the relative positions of the members 10 and 12 being regulated by the nuts 13 and 14 to correspond to the distance that the gear shift lever is from the dashboard, a distance that will vary with different makes of cars. When the novice is driving, he will have before him a plan showing the various positions for the gear shift lever to occupy.

I claim:—

1. An indicating guide for gear shift levers of vehicles, comprising a substantially flat body adjustably engageable over the gear shift lever of a vehicle, and provided with ways for guiding said lever in its various positions and indication means associated with said guiding ways for indicating the position of the gear shift lever with respect thereto.

2. An indicating guide for gear shift levers of vehicles, comprising a substantially flat body adjustably engageable over the gear shift lever of a vehicle, and provided with ways for guiding said lever in its various positions, indication means associated with said guiding ways for indicating the position of the gear shift lever with respect thereto, and means for adjustably securing said body adjacent the gear shift lever.

3. An indicating guide for gear shift levers of vehicles comprising a substantially flat body adjustably engageable over the gear shift lever of a vehicle, and provided with ways for guiding said lever in its various positions, means for adjustably securing said body adjacent the gear shift lever, and means carried by said body for normally preventing the gear shift lever from being placed in certain of its positions.

4. An indicating guide for gear shift levers of vehicles comprising a plate adapted to be fastened to parts of the vehicle, a substantially flat body adjustably engageable over the gear shift lever of a vehicle and secured to said plate, said body having ways therein for guiding the gear shift lever in its various positions, indication means associated with said guide ways for indicating the position of the gear shift lever with respect thereto, and means carried by said body to normally prevent the gear shift lever from being placed in certain of its positions.

5. An indicating guide for gear shift levers of vehicles comprising a plate adapted to be fastened to parts of the vehicle, a substantially flat body adjustably secured to said plate and engageable over the gear shift lever of the vehicle, said body having ways therein for guiding the gear shift lever in its various positions, indication means associated with said guide ways for indicating the position of the gear shift lever with respect thereto, and a finger pivoted on said plate and frictionally held in position thereon for normally preventing the gear shift lever from being placed in certain of its positions.

Dated this 15th day of September, 1928.

JOHN SPENCER CONROY.